United States Patent [19]

Abel

[11] 4,008,928
[45] Feb. 22, 1977

[54] LUBRICATING SELF-ALIGNING BEARING

[76] Inventor: Martin Abel, 25235 Canterbury, Franklin, Mich. 48025

[22] Filed: Mar. 25, 1975

[21] Appl. No.: 561,993

[52] U.S. Cl. .............................. 308/72; 308/121; 308/132

[51] Int. Cl.² .................. F16C 1/24; F16C 11/08; F16C 25/04; F16C 27/04

[58] Field of Search .......... 308/72, 26, 132, 134.1, 308/243, 121; 222/250; 252/14

[56] References Cited
UNITED STATES PATENTS

| | | | |
|---|---|---|---|
| 2,193,713 | 3/1940 | Cole | 308/134.1 |
| 2,270,392 | 1/1942 | Talmage et al. | 308/26 |
| 2,316,693 | 4/1943 | Hoddy | 308/132 |
| 2,922,682 | 1/1960 | Abel | 308/132 |
| 2,966,459 | 12/1960 | Abel | 252/14 |
| 3,053,421 | 9/1962 | Abel | 222/250 |
| 3,053,588 | 9/1962 | Abel | 308/121 |
| 3,214,375 | 10/1965 | Berkeley | 308/243 X |
| 3,317,256 | 5/1967 | Ernest | 308/72 |
| 3,466,244 | 9/1969 | Abel | 252/14 |

Primary Examiner—L. J. Paperner
Assistant Examiner—Howard Beltran
Attorney, Agent, or Firm—Lane, Aitken, Dunner & Ziems

[57] ABSTRACT

A self-aligning pod bearing assembly includes a cylindrical casing forming a socket for a bead-shaped porous bearing which is urged against the socket by means of a resilient bearing retainer which fits between a shoulder portion of the casing and the spherical bearing. The inside of the casing is filled with wicking material exposed through the bearing retainer to an oil slinger mounted for rotation with the shaft adjacent the end of the bearing contacted by the retainer and another oil slinger rotationally mounted on the shaft adjacent the other end of the bearing. In the preferred embodiments the outer diameter of the casing is formed by the same casing member which forms the interior bearing socket thus insuring coaxiality of the nominal bearing axis and the outer diameter of the casing.

5 Claims, 6 Drawing Figures

LUBRICATING SELF-ALIGNING BEARING

BACKGROUND OF THE INVENTION

The invention relates generally to journal bearings, and more particularly to self-aligning and self-lubricating journal bearings of simple construction.

Inexpensive bearings for light machinery, for example, the rotor shaft of a fractional horsepower electric motor, must be capable of efficient mass production while conforming to relatively rigid tolerances and long useful lifetimes. During manufacture of a self-lubricating bearing, a fluent, oil-impregnated, fibrous wicking material is injected into the cavity surrounding a porous bearing of sintered metal through which the oil penetrates to reach a shaft jounaled for rotation in a bore in the bearing. A self-aligning bearing of the self-lubricating type has a truncated spherical, bead-shaped porous bearing which is received for limited universal movement in a socket formed by a casing. In the past, the two sides of the casing itself have contacted opposite spherical surfaces of the bearing to complete the "ball and socket" arrangement with enough friction to prevent the bearing from rotating with the shaft while enabling pre-alignment of the axis of the bearing within the casing with the axis of the shaft to be journaled therein.

One of the production problems in manufacturing a self-lubricating, self-aligning bearing of this general type is "quality control" of the degree of tightness of the bearing in the socket. Another problem is to insure that the two elements which form the bearing socket are precisely concentric. Moreover, if the bearing is to fit in a mounting hole in the end bell of a motor, for example, the geometric center of the spherical bearing should lie on the axis of the mounting hole. This is known as the requirement for "concentricity." Slight deviations from concentricity can have a drastic effect on the way in which the bearing wears with use and thus can reduce its average useful lifetime and/or make the lifetime too unpredictable.

SUMMARY OF THE INVENTION

Accordingly, the general purpose of the invention is to facilitate manufacture of inexpensive self-aligning, self-lubricating bearings having reliable concentricity and bearing tightness. A more specific object of the invention is to insure that the spherical bearing is concentric with the outer diameter of the bearing assembly casing.

These and other objects of the invention are accomplished by providing a two-part casing in which one part forms a tapered socket, preferably conical, and the other part has an interior shoulder which supports a resilient bearing retainer. A bead-shaped, truncated spherical, porous bearing fits between the bearing retainer and the socket. The bearing retainer engages a spherical surface of the bearing and resiliently urges it against the socket. The two parts of the casing are mating elements having respective coaxial apertures through which the journaled shaft can extend.

In one embodiment, the part of the casing having the socket also has a cylindrical outer flange which overlaps the other part of the casing. Thus the same member integrally defines the outer diameter of the whole bearing assembly as well as the axis of the bearing socket. The bearing socket, against which the bearing is pressed, in turn makes the center of the porous bearing concentric with the outer diameter of the assembly. In manufacture, the outer diameter is specified such that the entire bearing assembly can be press-fit into a mounting hole formed in an end bell, for example, for a light duty electric motor. In one embodiment the maximum radial width of the bearing retainer is substantially less than the inner diameter of the adjacent cylindrical flange of the casing so that there is some play for the retainer to "float" or shift laterally during assembly to insure concentricity of the retainer fingers and the bearing socket. There is enough room in the part of the casing between the retainer and the adjacent aperture in the casing for an oil slinger to be mounted to recirculate oil to the wicking material. Other embodiments and several production techniques are also disclosed offering various trade-offs in design from the standpoint of low cost mass production and reliability.

DESCRIPTION OF THE PREFERRED EMBODIMENTS

The self-aligning bearing assembly disclosed herein is referred to as a pod bearing because the porous bearing member is housed within a cylindrical case adapted to be fitted in a mounting hole, for example, in the end bell of an electric motor. In this way, the pod bearing can be employed as a direct replacement for other types of bearings having a cylindrical casing, such as ball bearings, commonly used in high quality fractional horsepower motors.

Figure 1:
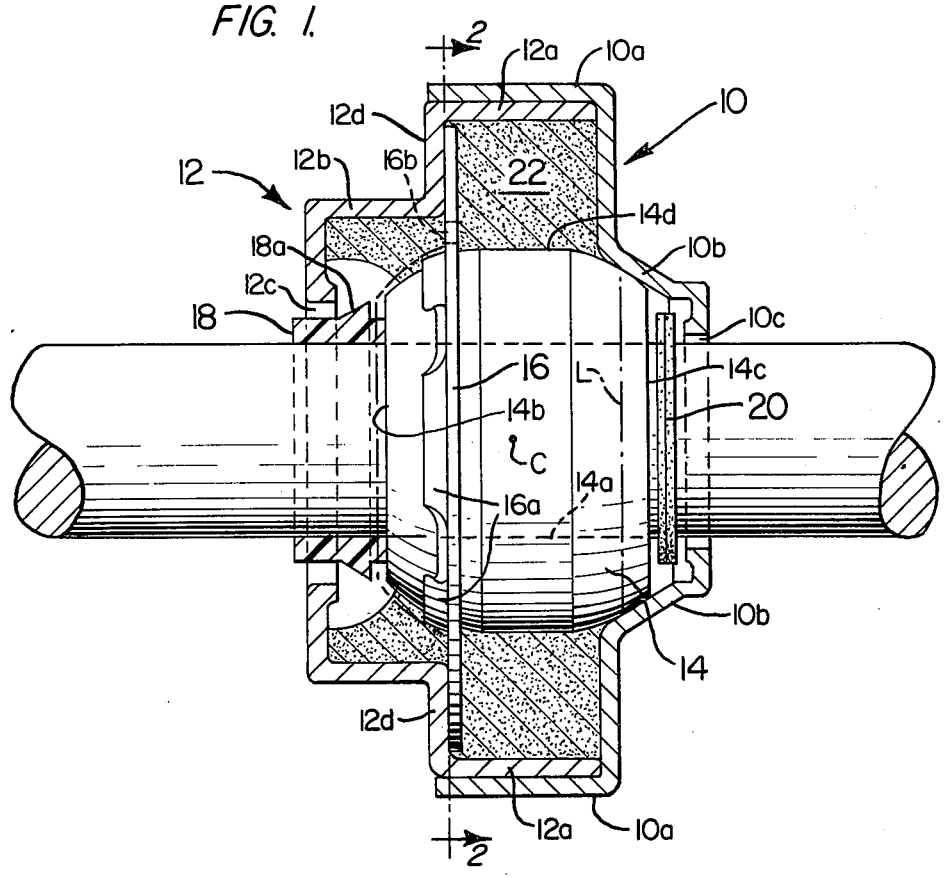
FIG. 1 is a sectional view in elevation of a pod bearing assembly constructed in accordance with the principles of the invention.

FIG. 1 illustrates a self-aligning, slef-lubricating pod bearing including mating, cup-shaped casing halves 10 and 12. Outer casing half 10 has an outer cylindrical flange portion 10a overlapping an inner cylindrical flange portion 12a of the other casing half. The outer casing half 10 has an integral conical socket portion 10b of reduced diameter, coaxial, however, with the cylindrical axis of the flange portion 10a. The conical portion 10b is truncated to form an opening 10c through which a shaft journaled in the bearing can pass. A bead-shaped, truncated spherical porous bearing 14 with a central bore 14a, rests against the inside of the socket portion 10b. The bearing 14 has parallel flat ends 14b and 14c orthogonal to the axis of the bore 14a. The coaxial surface of the bearing 14 intermediate the ends 14b and 14c can be flattened to form coaxial cylindrical surface 14d, if desired. The spherical surface adjacent the flat (right-hand) end 14c of the bearing contacts the conical inner surface of the socket 10b in a circular line L.

The inner casing half 12 has a coaxial cylindrical portion of reduced diameter 12b having a coaxial circular opening therein 12c through which the journaled shaft can pass. The two cylindrical portions of the casing half 12, i.e., 12a and 12b, are joined by a coaxial annulus 12d having an inner surface providing an annular shoulder for a washer-shaped bearing retainer 16 made of spring steel. The retainer 16 has radially inwardly projecting spring fingers 16a, defining a spherical annulus, adapted to engage the spherical surface of the bearing 14 adjacent to the flat (left-hand) end 14b, and due to spring tension, to urge the bearing 14 against the socket portion 10b of the outer casing half 10. In this way, the bearing 14 is held under spring tension in a captive ball and socket configuration allowing universal pivoting about the center C of the concentric spherical surfaces thereof.

A ring-shaped, oil slinger and thrust bearing 18, preferably of nylon, with a radial flange 18a is press-fit for rotation with the journaled shaft adjacent to the bearing end 14b, with a terminal portion extending out through the opening 12c. Adjacent to the other bearing end 14c, a washer-shaped oil slinger and thrust bearing 20 is press-fit over the end of the journaled shaft for rotation therewith. The slinger 20 preferably has a rubber backing with an oil impregnated phenolic linen surface facing the flat bearing end 14c.

Figure 2:
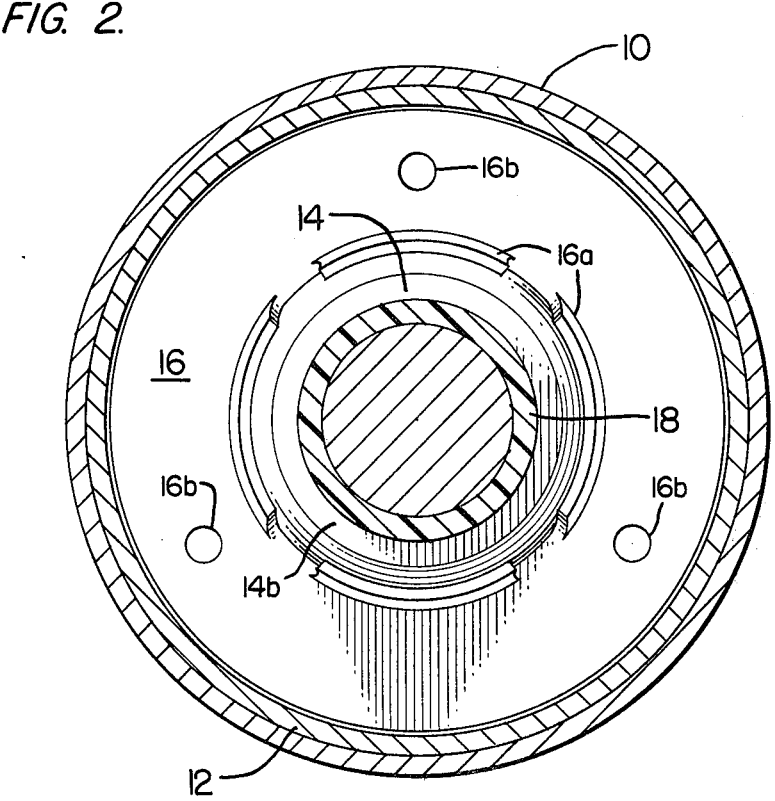
FIG. 2 is a view of the bearing retainer taken along lines 2—2 of FIG. 1.

The vacant interior volume between the casing 10, 12 and the bearing 14 is filled with a fluent oil-impregnated, fibrous wicking material 22 such as that disclosed in U.S. Pat. Nos. 2,966,459 to Abel, 3,466,244 to Abel and 3,214,375 to Berkeley. This wicking material is sold under the trademark "Permawick." Holes 16b shown in FIG. 2 in the bearing retainer 16 communicate the two "compartments" partitioned in the casing by the retainer 16. Alternatively, peripheral portions of the retainer disk can be cut away.

In production, the inner casing half 12 is clamped on an indexing table (not shown) having a mushroom-shaped inflatible rubber tongue that fits just inside the opening 12c in order to seal the opening. Next a retainer 16 is dropped into place against the annular shoulder 12d. The spherical bearing 14 is placed, flat end 14b down, in the center of the retainer 16. The interior volume defined by the casing half 12, rubber tongue (not shown) and the bearing 14 is filled with Permawick 22 by means of an injection machine, of the type shown in U.S. Pat. No. 3,053,421 to Abel, which shoots the fluent Permawick into the interior volume. Then the oil slinger 20 is laid on top of the bearing end 14c. Thereafter, the outer casing half 10 is press-fitted over the inner casing half 12 such that the flange 10a overlaps the flange 12a and the conical socket portion 10b contacts the bearing 14. The outer diameter of the bearing retainer 16 is less than the inner diameter of the inner flange 12a to provide clearance so that the bearing retainer 16 can "float" laterally. When the outer casing half 10 is fitted to the bearing assembly the socket portion 10b aligns the bearing 14 by shifting the bearing retainer 16 perpendicularly to its axis, if necessary. When the edge or lip of the inner flange 12a "bottoms out" against the outer casing half 10, the bearing retainer 16 will be precisely coaxially positioned, along with the bearing 14, in relation to the socket portion 10b. Moreover, the outer cylindrical diameter defined by the flange 10a is also coaxial with the socket portion 10b by virtue of the fact that the socket and outer flange are formed integrally by the same piece in a single stamping. Thus there is no way for the two surfaces to become misaligned. As a final step, after removing the bearing assembly from the indexing table, the oil slinger 18 is snapped into place through the opening 12c. All parts can be hopper-fed for assembly.

To prevent the outer diameter of the flange 10a from being distorted by the press-fit a collar-like female die tooling (not shown) may be fitted around the outer flange 10a as a retainer during the press-fitting operation.

The importance of concentricity cannot be overstressed. The ball bearings which the self-aligning bearings of this invention are designed to replace have outer diameter tolerances on the order of ± 0.025 mm. It is necessary therefore for the outer surface of the flange 10a in FIG. 1 to be stamped out with exactly the same tolerance. Because the casing half 10 is formed in one stamping, the conical socket 10b and the flange 10a will be precisely coaxial. Consequently, urging the spherical bearing 14 against the socket 10b insures that the bearing, whatever its orientation, will always be precisely concentric with the outer diameter of the flange 10a. The collar-like tooling around the flange 10a insures that concentricity is maintained during the final press-fitting step.

Before the bearing assembly is put to use, the oil slingers 18 and 20 are loosely trapped between the bearing 14 and the respective openings 10c and 12. Upon installation, the pod bearing assembly is pressed into place in a mounting hole which conforms to the outer diameter of the casing flange 10a, and the journal shaft is in effect "threaded" through the oil slingers 18 and 20 and the bearing 14. Any misalignment or non-coaxiality of the shaft and the hole into which the pod bearing assembly is inserted is automatically accommodated at initial installation by pivoting of the bearing 14 in the socket formed by the retainer 16 and the socket portion 10b of the casing. After initial alignment, the bearing 14 should not rotate but should be securely held with enough friction by virtue of the spring force of the retainer 16 to prevent rotation of the bearing due to rotation of the shaft about its axis.

The oil in the Permawick 22 penetrates through the porous bearing 14 to be deposited on the inside surface of the bore 14a to form a lubricating oil surface to isolate the shaft from the bearing surface. As oil works its way out of the bore 14a, it is slung back into the body of Permawick material 22 by means of the radial flange 18a on the oil slinger 18. At the other bearing end 14c, oil is slung outwardly by the radial surfaces of the oil slinger 20 against the interior conical surface of the socket 10b. The oil is circulated back into the bearing 14 as it collects by gravity at the lowermost part of the line contact L.

Figure 3:
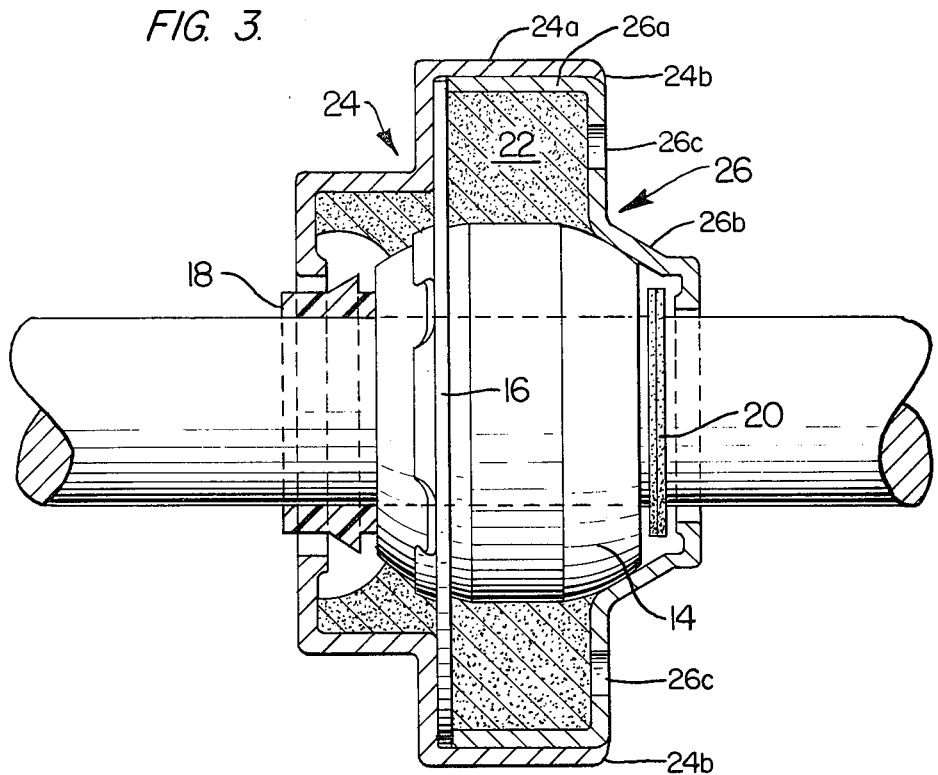
FIG. 3 is a sectional view in elevation of another embodiment of a pod bearing assembly constructed in accordance with the principles of the invention.

In an alternative design shown in FIG. 3, the relationship of the casing halves is reversed. The casing half 24 forming the supporting shoulder for the bearing retainer 16 forms the outer casing half which fits over an inner casing half 26 which includes the conical socket portion (26b) for the bearing 14. Thus the socket-half of the casing includes an inner cylindrical flange 26a which is overlapped by an outer cylindrical flange 24a of the casing half which supports the retainer 16.

In production of the embodiment of FIG. 3, the casing half 24 is clamped on the indexing table (not shown), as with the embodiment of FIG. 1, and the retainer 16 is slipped into place on the shoulder of the casing half 24 and the bearing 14 and slinger 20 are dropped into place. The socket casing half 26 is slipped inside the flange 24a. The leading edge or lip of the flange 26a is driven home against the peripheral surface of the retainer 16. Because the flange 26a bottoms out against the retainer 16, the retainer 16 is clamped between the two casing halves 24 and 26. Finally the lip 24b of the outer flange 24a is rolled over the edge of the inner flange 26a to firmly join the two casing halves. Permawick 22 is injected into the interior volume defined by the completed assembly through ports 26c in the casing.

In the embodiment of FIG. 3, the bearing retainer 16 is locked in place so that it cannot rotate. In the embodiment of FIG. 1 the bearing retainer 16 normally will not rotate because the spring tension of the retainer 16 presses it firmly against the shoulder 12d. In addition to the friction between the fingers 16b and the contacted surface of bearing 14, the bearing 14 is urged into frictional line contact with the socket 10b. However, in the embodiment of FIG. 1 if the spring tension were insufficient, it would be possible for the bearing 14 and retainer 16 to rotate with the shaft. Neither rotation of the bearing nor rotation of the retainer 16 is desirable; however, rotation of the retainer 16 has a far more deleterious effect on the bearing assembly.

The clamping feature of the embodiment of FIG. 3 is of course obtained at the expense of some degree of reliability in the concentricity of the bearing assembly. The outer diameter of the bearing assembly is formed by the cylindrical surface of the flange 24a which is separate from the casing half which forms the socket for the bearing 14. It is more difficult to control the coaxiality between two separately manufactured pieces. In the case of FIG. 3 coaxiality must exist between the socket 26b and the cylindrical shape of the flange 24a which means that closer tolerances must be observed for both pieces. Normally, in the embodiment of FIG. 3 the retainer 16 will receive enough pressure to float laterally as the socket 26b presses downwardly on the bearing 14 before the flange 26a bottoms out against the retainer 16. However, it is possible that bottoming out will occur before the float adjustment is finished which could result in a slight sacrifice in concentricity between the retainer 16 and the casing socket 26b.

Figure 4:
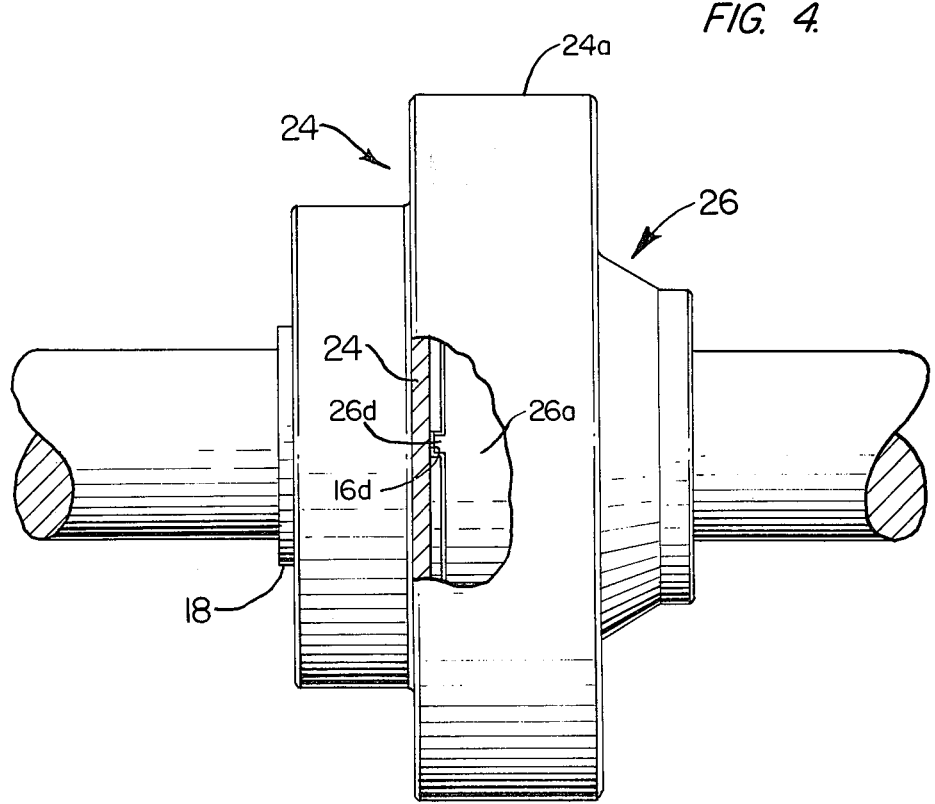
FIG. 4 is a side view in elevation with portions broken away of a variation on the embodiment of FIG. 3.

A way of locking the retainer 16 against rotation is to provide a key and slot arrangement which avoids clamping of the retainer 16 and allows full float adjustment. FIG. 4 shows a modification of the embodiment of FIG. 3 where the flange 26a has a single depending tooth 26d which fits loosely in a small radial notch 16d formed in the periphery of the retainer 16. With the bearing retainer 16 keyed against rotation it is not necessary for the edge of the flange 26a to bottom out against the retainer 16. Accordingly, a small amount of clearance will be left between these elements to allow the bearing retainer 16 to float into coaxial alignment with the socket 26b during assembly.

The embodiment of FIG. 1 could be similarly modified, for example, by providing a projection on the shoulder 12d which fits into a suitable hole or notch in the retainer 16 to key the retainer against rotation. For example, one of the holes 16b could be dimensioned and positioned to fit over a tooth-like projection extending in a direction parallel to the axis of the bearing from the shoulder 12d.

A disadvantage of the technique of keying the retainer against rotation is that during production the retainer 16 must be correctly oriented in relation to the key that fits into the notch of the retainer 16. This orientation introduces an indexing requirement which is avoided in the embodiments of FIGS. 1 and 3 where the orientation of the retainer 16 is immaterial.

Figure 5:
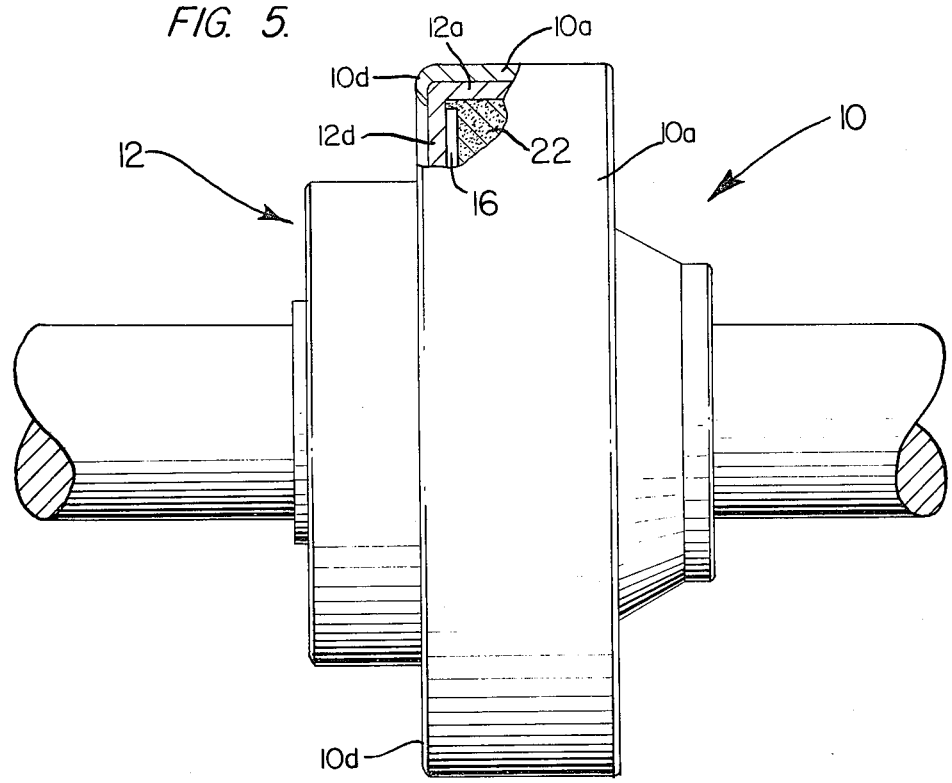
FIG. 5 is a side view in elevation with portions broken away of a variation on the embodiment of FIG. 1.

FIG. 5 illustrates a variation on FIG. 1 in which, instead of press-fitting, the lip 10d of the outer flange 10a is "spun" over, by pressing a flat tool against the spinning edge, to firmly join the casing halves 10 and 12. The embodiment of FIG. 5 has the advantage of not requiring a press-fit for the casing halves, thus lessening the tolerance for the inner casing half 12. Concentricity between the bearings 14 and flange 10a is insured without using a female die tooling for retaining the outer flange 10a during final assembly.

Figure 6:
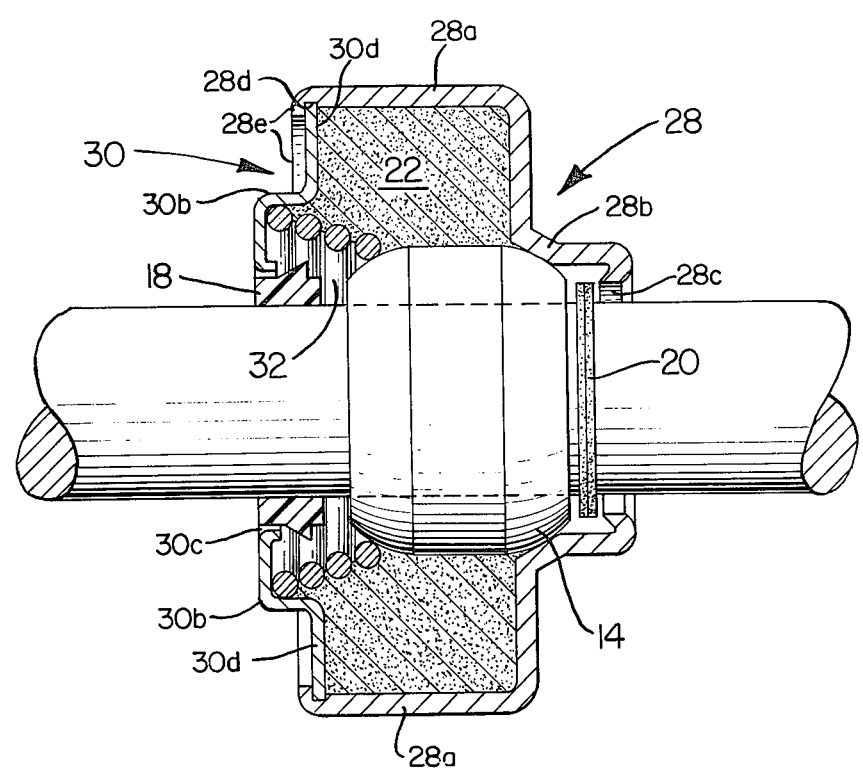
FIG. 6 is a sectional view in elevation of another embodiment of a pod bearing assembly constructed in accordance with the principles of the invention.

In FIG. 6 the bearing assembly casing is formed by a cup-shaped part 28 and a closure cap 30 having an inner cylindrical porion 30b with a coaxial aperture 30c and an outer radially extending annular flange 30d. The casing part 28 having shaft aperture 28c is similar to casing half 10 of FIG. 1 in that the flange 28a forming the precisely dimensioned outer diameter of the assembly is formed integrally with the bearing socket portion 28b in a single stamping, thus insuring coaxiality of the socket and outer flange. The lip of the flange is given a short counterbore 28d which receives the radial flange 30d of the cap 30. The larger end of a conical coil compression spring 32 is received in the inner cylindrical portion 30b of the cap 30. The smaller end of the spring 32 contacts the adjacent spherical surface of the bearing 14 and urges the bearing against the socket portion 28b. As in the embodiment of FIG. 1, the concentricity of the bearing with the outer diameter of the casing is thus insured. For final assembly the thin lip 28e of the flange 28a is spun over or rolled over the radial periphery of the cap 30 to permanently close the casing. Permawick 22 fills the interior volume of the bearing assembly defined by bearing 14, casing 28,30 and spring 32. In use, the slinger 18 recirculates oil to the Permawick 22 through the interspaces of the spring 32. Advantageously, the spring 32 has the capability of accommodating slight axial misalignment with the socket portion 28b by slightly shifting the smaller end radially (orthogonally to the bearing axis). The flange 28a is thicker than in the double-wall embodiments so that it will support an outer diameter of close tolerances equivalent to those of typical ball bearings. Because of the conical spring 32, the axial length of the Permawick cavity is increased in FIG. 6 without providing special chambers. Thus, while maintaining exactly the same outer diameter, the Permawick volume is increased providing a more adequate lubricant reservoir. In addition, the conical spring 32 and cap 30 typically cost less than the flat retainer 16 and casing half 12 of FIG. 1.

The alternative techniques of injecting Permawick before closing the casing or injecting afterwards through injection ports are equally applicable to all of the embodiments disclosed above.

The above-described embodiments are intended to be illustrative, not restrictive, the full scope of the invention being indicated by the appended claims, and any and all equivalents thereto are intended to be embraced therein.

What is claimed is:

1. A bearing assembly for a shaft, comprising a casing having two coaxial mating casing parts with respective coaxial apertures dimensioned to provide clearance for a shaft journaled in the bearing assembly, one of said casing parts having an interior tapered coaxial socket portion adjacent the respective aperture, a rounded porous bearing with a central bore for a shaft coaxially seated in said socket portion, the other casing part having a coaxial annular shoulder defining an interior annular recess surrounding and communicating with said bearing, coaxial spring means supported axially against said shoulder in said recess for contacting a rounded surface of said bearing to urge said bearing firmly against said socket portion such that the geometrical center of the bearing is positioned by the axis of the socket portion to form a captive ball and socket arrangement permitting universal pivoting of said bearing to accommodate initial misalignment with a shaft journaled therein, the interior annular recess of said casing being substantially filled with a lubricant impregnated wicking material, a ring-shaped oil slinger dimensioned to fit tightly around a shaft to be journaled in the bearing assembly for rotation therewith coaxially positioned in an annular end portion of said casing outwardly of said bearing to sling lubricant radially outward into said annular end portion surrounding said oil slinger, said spring means having means for intercommunicating said interior annular recess with said annular end portion to enable lubricant thrown radially outward from said oil slinger to be recirculated to said wicking material in said interior annular recess.

2. The assembly of claim 1 wherein said coaxial spring means comprises a coaxial resilient ring shaped bearing retainer supported axially against said annular shoulder in said interior annular recess and having a central coaxial aperture in contact with the rounded surface of said porous bearing, said wicking material in said interior annular recess contacting one side of said bearing retainer, said annular end portion being filled with additional wicking material surrounding said oil slinger and contacting the other side of said bearing retainer, said bearing retainer having means for intercommunicating the wicking material on both sides thereof.

3. The assembly of claim 1 wherein said coaxial annular shoulder is located axially outwardly of said porous bearing, said coaxial spring means comprises a coil spring having its outer end engaging said coaxial annular shoulder and its inner end contacting the rounded surface of said porous bearing, and said oil slinger is positioned within said coil spring, the outer surface of said coil spring contacting the wicking material within said interior annular space, the convolutions of the coil spring being spaced from one another to enable lubricant thrown radially out by the oil slinger to pass therebetween into said wicking material.

4. A bearing assembly for a shaft, comprising a casing having two coaxial mating casing parts with respective coaxial apertures dimensioned to provide clearance for a shaft journaled in the tapered coaxial socket portion adjacent the respective aperture, a rounded porous bearing with a central bore for a shaft coaxially seated in said socket portion, the other casing part having a coaxial annular shoulder defining an interior annular recess, a coaxial resilient ring-shaped bearing retainer supported axially against said shoulder in said recess and having a central coaxial aperture in contact with a rounded surface of said bearing to urge said bearing firmly against said socket portion such that the geometrical center of the bearing is positioned by the axis of the socket portion to form a captive ball and socket arrangement permitting universal pivoting of said bearing to accommodate initial misalignment with a shaft journaled therein, said retainer being notched and keyed against coaxial rotation by one of said casing parts.

5. A bearing assembly for a shaft, comprising a casing having two coaxial mating casing parts with respective coaxial apertures dimensioned to provide clearance for a shaft journaled in the bearing assembly, one of said casing parts having an interior tapered coaxial socket portion adjacent the respective aperture, a rounded porous bearing with a central bore for a shaft coaxially seated in said socket portion, the other casing part having a coaxial annular shoulder defining an interior annular recess, a coaxial resilient ring-shaped bearing retainer supported axially against said shoulder in said recess and having a central coaxial aperture in contact with a rounded surface of said bearing to urge said bearing firmly against said socket portion such that the geometrical center of the bearing is positioned by the axis of the socket portion to form a captive ball and socket arrangement permitting universal pivoting of said bearing to accommodate initial misalignment with a shaft journaled therein, the other casing part having an outer cylindrical flange forming the outer diameter of the assembly, said retainer having a maximum radial width substantially less than the inner diameter of said other casing part to provide clearance for floating lateral adjustment of said retainer during assembly, said one casing part having an inner cylindrical flange overlapped by said flange of said other casing part, the leading edge of the overlapped inner flange of said one casing part clamping said retainer member against said annular shoulder of said other casing part after assembly to prevent coaxial rotation of said retainer.

* * * * *